(12) United States Patent
Peng et al.

(10) Patent No.: US 10,869,368 B2
(45) Date of Patent: Dec. 15, 2020

(54) MICROWAVE RICE COOKER

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Dingyuan Peng, Foshan (CN); Maoshun Chen, Foshan (CN); Xiangwei Tang, Foshan (CN); Chun Luan, Foshan (CN); Xuan Wang, Foshan (CN); Minyong Liu, Foshan (CN)

(73) Assignees: GUANGDONG MIDEA KITCHEN APPLIANCES MANUFACTURING CO. LTD., Foshan (CN); MIDEA GROUP CO. LTD., Foshan (CN)

( * ) Notice: Subject to any disclaimer, the term of this patent is extended or adjusted under 35 U.S.C. 154(b) by 493 days.

(21) Appl. No.: 15/836,637

(22) Filed: Dec. 8, 2017

(65) Prior Publication Data

US 2018/0153005 A1    May 31, 2018

Related U.S. Application Data

(63) Continuation of application No. PCT/CN2015/093576, filed on Nov. 2, 2015.

(30) Foreign Application Priority Data

Jun. 8, 2015 (CN) .......................... 2015 1 0314030

(51) Int. Cl.
*H05B 6/80* (2006.01)
*A47J 37/06* (2006.01)
(Continued)

(52) U.S. Cl.
CPC .............. *H05B 6/80* (2013.01); *A47J 27/002* (2013.01); *A47J 37/0629* (2013.01); *H05B 6/70* (2013.01); *H05B 6/72* (2013.01)

(58) Field of Classification Search
CPC ....... A47J 27/002; A47J 37/0629; H05B 6/80; H05B 6/701; H05B 6/70; H05B 6/72
(Continued)

(56) References Cited

U.S. PATENT DOCUMENTS 2,919,336 A * 12/1959 Hahn ........................ F24C 7/02
                                                    219/746
2,956,144 A * 10/1960 Woodman .............. H05B 6/745
                                                    219/756
(Continued)

FOREIGN PATENT DOCUMENTS

CN      1751635 A       3/2006
CN    102860745 A       1/2013
(Continued)

OTHER PUBLICATIONS

Guangdong Midea Kitchen Appliances Manufacturing Co., Ltd., International Search Report and Written Opinion, PCT/CN2015/093576, dated Mar. 14, 2016, 19 pgs.
(Continued)

*Primary Examiner* — Jimmy Chou
(74) *Attorney, Agent, or Firm* — Morgan, Lewis & Bockius LLP

(57) ABSTRACT

Provided is a microwave rice cooker, comprising a cavity structure, a door assembly and an inner pot (20). The cavity structure comprises a microwave transmitting mechanism, a cavity (2) provided with a cylindrical cooking chamber therein, and a top cap (1) and a bottom cap (5) located at two ends of the cooking chamber respectively. The bottom cap (5) closes the cooking chamber at the bottom. A top opening
(Continued)

of the cooking chamber is formed on the top cap (1). The inner pot (20) can be put into or taken out of the cooking chamber through the top opening. The door assembly is mounted on the top cap (1) in an openable and closable manner so as to open or close the cooking chamber from the top. The microwave transmitting mechanism is mounted at the bottom of the bottom cap (5) to feed microwaves into the cooking chamber from the bottom. The microwave rice cooker achieves a two-in-one function of a microwave oven and a rice cooker.

15 Claims, 10 Drawing Sheets

(51) Int. Cl.
    *H05B 6/72*     (2006.01)
    *H05B 6/70*     (2006.01)
    *A47J 27/00*     (2006.01)

(58) Field of Classification Search
    USPC .................................................. 219/678, 703
    See application file for complete search history.

(56) References Cited

U.S. PATENT DOCUMENTS

| | | | |
|---|---|---|---|
| 4,728,762 A | 3/1988 | Roth et al. | |
| 5,250,772 A * | 10/1993 | Booske | H05B 6/80 219/734 |
| 5,252,797 A * | 10/1993 | Komatsu | H05B 6/642 219/729 |
| 5,967,021 A * | 10/1999 | Yung | A21B 7/005 366/144 |
| 6,730,895 B2 * | 5/2004 | Kim | H05B 6/6479 219/682 |
| 6,825,452 B2 * | 11/2004 | Oh | H05B 6/6479 219/682 |
| 10,143,324 B2 * | 12/2018 | Kataoka | A47J 36/06 |
| 2004/0250689 A1 * | 12/2004 | De'Longhi | A47J 36/027 99/403 |
| 2005/0184064 A1 * | 8/2005 | Ohyama | A47J 27/04 219/725 |
| 2006/0006172 A1 * | 1/2006 | Sedlmayr | B01D 1/2896 219/688 |
| 2006/0289517 A1 * | 12/2006 | Lorbach | H05B 6/6494 219/730 |
| 2007/0095823 A1 * | 5/2007 | Sedlmayr | H05B 6/806 219/688 |
| 2008/0202352 A1 * | 8/2008 | Comito | H05B 6/6426 99/339 |
| 2011/0259881 A1 * | 10/2011 | Jagannathan | A47J 27/09 219/679 |
| 2012/0312807 A1 * | 12/2012 | Fitzwater | H05B 6/6408 219/730 |
| 2013/0087555 A1 * | 4/2013 | Hirano | H05B 6/687 219/720 |
| 2013/0105468 A1 * | 5/2013 | Reischmann | H05B 6/12 219/621 |
| 2014/0322416 A1 * | 10/2014 | Sanseverino | A47J 27/092 426/523 |
| 2015/0257208 A1 * | 9/2015 | Li | H05B 6/6402 219/702 |
| 2018/0014366 A1 * | 1/2018 | Tang | H05B 6/6402 |

FOREIGN PATENT DOCUMENTS

| | | | |
|---|---|---|---|
| CN | 104864427 A | | 8/2015 |
| CN | 104879800 A | | 9/2015 |
| CN | 104879801 A | | 9/2015 |
| CN | 104902604 A | | 9/2015 |
| CN | 204786622 U | | 11/2015 |
| CN | 204786623 U | | 11/2015 |
| CN | 204786624 U | | 11/2015 |
| CN | 204810584 U | | 11/2015 |
| JP | 0571739 A | | 3/1993 |
| JP | 06337116 A | * | 12/1994 |
| JP | 06337116 A | | 12/1994 |
| JP | 10028646 A | * | 2/1998 |
| JP | 2000210193 A | | 8/2000 |
| JP | 3477110 B2 | * | 12/2003 |
| JP | 2000316716 A | * | 12/2003 |
| JP | 2011144942 A | | 7/2011 |
| JP | 2012196248 A | | 10/2012 |
| KR | 200136105 Y1 | | 5/1999 |
| KR | 100643893 B1 | * | 11/2006 |
| KR | 100643893 B1 | | 11/2006 |

OTHER PUBLICATIONS

Guangdong Midea Kitchen Appliances Manufacturing Co., Ltd., International Preliminary Report on Patentability, PCT/CN2015/093576, dated Dec. 12, 2017, 5 pgs.

Guangdong Midea Kitchen Appliances Manufacturing Co., Ltd., International Search Report and Written Opinion, PCTCN2016070189, dated Apr. 11, 2016, 19 pgs.

Guangdong Midea Kitchen Appliances Manufacturing Co., Ltd., International Preliminary Report on Patentability, PCTCN2016070189, dated Sep. 26, 2017, 5 pgs.

* cited by examiner

MICROWAVE RICE COOKER

PRIORITY CLAIM AND RELATED APPLICATION

This application is a continuation application of PCT/CN2016/070189, entitled "MICROWAVE RICE COOKER" filed on Nov. 2, 2015, which claims priority to Chinese Patent Application No. 201510314030.4, filed with the State Intellectual Property Office of the People's Republic of China on Jun. 8, 2015, and entitled "MICROWAVE RICE COOKER", both of which are incorporated herein by reference in their entirety.

FIELD OF THE INVENTION

The present application relates to the field of home appliances, in particular to a microwave heating product.

BACKGROUND OF THE INVENTION

Microwave ovens commonly used in daily life are modern cooking utensils that utilize microwaves to heat up foods, and have a power range of about 500-1,000 W. As shown in FIG. 1, a microwave oven generally comprises a power supply unit, a magnetron 11, a control circuit and a cooking chamber, etc. The power supply unit provides about 4,000V high voltage to the magnetron 11, the magnetron 11 generates microwaves continuously under the excitation from the power supply unit, and then the microwaves are transmitted through a waveguide assembly 6 and coupled to the cooking chamber. A rotatable agitator is provided near an inlet of the cooking chamber. Owing to the fact that the agitator consists of fan-shaped metal plates, it reflects the microwaves in all directions while it rotates, and thereby uniformly distributes the microwave energy in the cooking chamber and heating up the food in the cooling chamber.

As shown in FIGS. 1 and 2, at present, all microwave ovens in the market are in a square structure and have a square cooking chamber and a large internal space; thus, the space for structural arrangement is ample. However, in such a conventional square microwave oven, the uniformity of microwave distribution is poor owing to poor structural layout and irrational structural design of the components. Consequently, the heating efficiency and heating rate are low, and the heating effect is not uniform, resulting in a poor cooking experience of the user. The entire microwave oven industry has been bothered by that problem for long. To implement the functions of a rice cooker with a conventional microwave oven, a lot of microwave accessories have to be added to realize rick cooking, soup cooking, and congee cooking functions, etc. Consequently, there are numerous accessories, the structure is complex, and the space occupation is huge.

For example, in the square microwave oven shown in FIG. 2, the microwaves are fed through a waveguide assembly 6 into a cooking chamber, a door 27 is arranged on the front of the microwave oven, and may be opened by side pulling or downward pulling. Since the volume of the cavity is large and the waveguide assembly 6 is long, the microwaves are guided from a laterally mounted magnetron 11 through the waveguide assembly 6 into the bottom of the cavity and have to travel a long transmission path before they are fed into the microwave cavity. Consequently, the microwave transmission loss is huge. Specifically, when the microwaves generated from the magnetron 11 are transmitted in the microwave tube, microwave concentration may occur easily if the transmission path is long. As a result, the distribution of the microwaves in the microwave transmission cavity of the waveguide is not uniform, the microwaves may be focused and cause flashes easily at several places in the microwave transmission process, resulting in local temperature rise on the surface of the microwave tube, severely loss of microwave energy, and poor output efficiency stability of the microwave assembly 6; in addition, the heating uniformity and a best cooking effect can't be ensured in the cooking process.

Moreover, different existing microwave ovens employ a wide variety of microwave agitators, which are shaped and designed into different hollowed-out plate structures to adapt to the square cooking chamber. However, with such structures, it is always difficult to attain a continuous and excellent microwave distribution effect in the square cooking chamber.

As the society makes progress and is developed and diversified, the customers have a potential demand for new microwave products that have more functions and a smaller cavity, and are more compact and more portable. To that end, it is urgent task to redesign the structural layouts and components of microwave products completely.

SUMMARY OF THE INVENTION

In view of the above-mentioned drawbacks or defects in the prior art, the present application provides a microwave rice cooker accordingly, which is compact in size, has a smaller cavity, achieves high heating efficiency and a quicker and more uniform heating effect, and realizes a two-in-one function of a microwave oven and a rice cooker.

To attain the object described above, the present application provides a microwave rice cooker, which comprises a cavity structure, a door assembly, and an inner pot through which microwaves can be transmitted, the cavity structure comprises a microwave transmitting mechanism, a cavity provided with a cooking chamber therein, and a top cap and a bottom cap located at two ends of the cooking chamber respectively, the bottom cap encloses the cooking chamber at the bottom, a top opening of the cooking chamber is formed on the top cap, and the inner pot can be put into or taken out of the cooking chamber through the top opening; wherein, the door assembly is mounted on the top cap in an openable and closable manner so as to open or close the cooking chamber from the top, and the microwave transmitting mechanism is mounted at the bottom of the bottom cap to feed microwaves into the cooking chamber from the bottom.

Preferably, the bottom cap is in a disc shape, and has a recessed profiled space formed at the inner side of the bottom cap, a circumferential stepped part is arranged in the profiled space, a shelf through which microwaves can be transmitted is arranged on the circumferential stepped part, and the inner pot that is embedded in the cooking chamber may be borne on the shelf.

Preferably, a first end of the door assembly is hinged via a hinge mechanism to a first end of the top cap, an interlocking mechanism is arranged and a control panel assembly is mounted at a second end of the top cap, a door hook is arranged at a second end of the door assembly, the door assembly can be rotated around the hinge mechanism so as to enter into a closed state in which the cooking chamber is closed or an open state in which the cooking chamber is opened;

wherein, in the closed state, the door assembly covers the top surface of the top cap, the door hook is locked to the interlocking mechanism and the interlocking mechanism transmits a door close signal to the control panel assembly, the control panel assembly receives the door close signal and is triggered to an active state; in the open state, the interlocking mechanism transmits a door open signal, and the control panel assembly is switched to an inactive state according to the door open signal.

Preferably, the hinge mechanism comprises a pivot shaft and a torsion spring, the pivot shaft is mounted on the first end of the top cap, the door assembly can be pivoted around the pivot shaft, the torsion spring is fitted over the pivot shaft, and the two ends of the torsion spring are resiliently biased on the door assembly and the top cap.

Preferably, the door assembly comprises a door panel, a door body, and a door seal that are engaged sequentially from outer side to inner side, wherein, the door panel and the door body include a metal plate configured to seal the cooking chamber to prevent transmission of microwaves therein, the door hook extends downward from the door body, and the door seal is lined between the door body and the top cap to seal the cooking chamber when the door assembly is in the closed state.

Preferably, the cavity comprises a metal cylindrical plate configured to prevent transmission of microwaves, an inner cylindrical cavity of the cylindrical plate forms the cooking chamber, the top circumference of the cylindrical plate is connected to the top cap, the bottom circumference of the cylindrical plate is hermetically connected to the inner side wall of the bottom cap, and both of the top cap and the bottom cap are metal caps that can present transmission of microwaves.

Preferably, the diameter of the inner pot is smaller than the diameter of the cylindrical plate by at least 15 mm.

Preferably, the microwave rice cooker further comprises a circumferential enclosure and a base, the cavity structure is mounted on the base, the circumferential enclosure is arranged around the cavity, the top of the circumferential enclosure is engaged with the top cap, and the bottom of the circumferential enclosure is engaged with the base.

Preferably, the base is further provided with:

a frequency converter electrically connected to the magnetron of the microwave transmitting mechanism to regulate the supply voltage of the magnetron; and a cooling fan configured to dissipate heat from the frequency converter and the microwave transmitting mechanism.

Preferably, the microwave transmitting mechanism comprises a waveguide assembly and a magnetron, the waveguide assembly comprises a transverse part and a downward extension part that extends downward from the end of the transverse part, the magnetron is mounted on the downward extension part, and the magnetron inputs microwaves via a microwave inlet to a microwave transmission cavity in the waveguide assembly, the transverse part is arranged with a microwave outlet, the bottom of the bottom cap is arranged with a microwave feed inlet, the transverse part is connected to the bottom of the bottom cap so that the microwave outlet abuts against the microwave feed inlet to feed microwaves into the cooking chamber.

Preferably, the waveguide assembly comprises a base plate and a cover plate, the cover plate is in an "L" shape and comprises a transverse cover plate and a longitudinal cover plate, the base plate is in a "Z" shape and comprises a first transverse base plate, a downward extension plate, and a second transverse base plate arranged sequentially, flanged base plate edges are formed on the periphery of the base plate, and the cover plate hermetically covers the flanged base plate edges of the base plate to form the microwave transmission cavity between the base plate and the cover plate;

Wherein, the transverse cover plate is arranged above the first transverse base plate so as to form a transverse chamber of the microwave transmission cavity between the transverse cover plate and the first transverse base plate, the longitudinal cover plate is spaced from the downward extension plate in the transverse direction and the bottom of the longitudinal cover plate extends downward till it is engaged with the second transverse base plate to form a longitudinal chamber of the microwave transmission cavity among the downward extension plate, the second transverse base plate, and the longitudinal cover plate, the microwave outlet is arranged on the transverse cover plate, and the microwave inlet is arranged on the longitudinal cover plate.

Preferably, the microwave rice cooker further comprises at least one or all of the following features 1-8:

Feature 1: the downward extension plate and the longitudinal cover plate are parallel to each other, and both of them extend downward vertically;

Feature 2: the base plate is a single plate that is formed by bending and has flanged edges, the waveguide assembly further comprises angle iron pieces configured to seal the microwave transmission cavity in the lateral direction, and the angle iron pieces are mounted on the lateral flanged base plate edges at the corners where the transverse chamber and the longitudinal chamber of the microwave transmission cavity communicate with each other;

Feature 3: the flanged base plate edges are arranged with a welded connecting plate, and the cover plate is welded to the welded connecting plate;

Feature 4: the end of the first transverse base plate near the downward extension plate is arranged with a plurality of through-holes with flanged edge, each of the through-holes with flanged edge has a downward circumferential flanged edge, and the downward flanged height of the circumferential flanged edge is not smaller than 2 mm;

Feature 5: the inner side wall of the downward extension plate further has a spherical groove formed thereon opposite to the microwave inlet, and the outer wall of the spherical groove protrudes outward to separate antenna heads of the magnetron;

Feature 6: the bottom cap is a disc shape, and the outer end part of the waveguide assembly is located within the circumferential edge of the bottom cap in the radial direction of the bottom cap;

Feature 7: the length of the longitudinal cover plate in the longitudinal direction is not greater than 1.5 times of the length of the magnetron in the longitudinal direction;

Feature 8: the volume ratio of the longitudinal chamber to the transverse chamber of the microwave transmission cavity is not smaller than 2.

Preferably, the microwave rice cooker further comprises an agitating assembly, which comprises a microwave agitating plate and an agitating motor, the microwave agitating plate is in a disc shape and arranged between the shelf at the bottom of the cooking chamber and the bottom cap, the agitating motor is mounted below the bottom cap and a motor output shaft of the agitating motor penetrates through the bottom cap and is connected to the microwave agitating plate, and the microwave agitating plate is driven by the agitating motor to rotate to agitate the microwaves that enter into the cooking chamber.

Preferably, an arc chord part that is folded upward along a chord A is formed on the top surface of the microwave agitating plate, the arc chord part comprises an inclined flat reflecting surface and an upper arc chord surface, the inclined flat reflecting surface is inclined downward from a chord B of the upper arc chord surface and extend inward to the chord A on the top surface; the arc chord part further has a notch, by which the central part of the inclined flat reflecting surface is cut off and a transverse opening is formed in the central part;

The arc chord part is formed at one side of the center of circle of the microwave agitating plate, a first rectangular hole and a second rectangular hole that penetrate through the microwave agitating plate in the vertical direction are formed at the other side of the center of circle of the microwave agitating plate, an end of the first rectangular hole and an end of the second rectangular hole that are proximal to each other are close to each other and arranged at an included angle from each other, a distal end of the first rectangular hole extends toward one end of the chord A, and an distal end of the second rectangular hole extends towards the other end of the chord A; wherein, a longer side of the first rectangular hole and a longer side of the second rectangular hole that are near the center of circle have a reflecting flanged edge that is folded upward, respectively.

Preferably, the microwave rice cooker further comprises at least one or all of the following features A-E:

Feature A: the notch is a triangular notch, the triangular base of the notch is parallel to the chord A, a connecting line between the vertex of the triangle and the center of circle is perpendicular to the chord A and the chord B, the two sides of the triangular notch are cut sides, which are cut downward from the upper arc chord surface to the top surface of the microwave agitating plate so as to form the transverse opening;

Feature B: the reflecting flanged edge extends from a distal end of the longer side near the center of circle to the center of the longer side;

Feature C: the first rectangular hole and the second rectangular hole are arranged at an right angle from each other, the extension lines of the center lines of the first rectangular hole and the second rectangular hole in the respective length direction intersect each other, and the intersection, the center of circle, and the vertex of the triangle are in the same line;

Feature D: the planar included angle between the inclined flat reflecting surface and the top surface is 145°-150°, and the height of the inclined flat reflecting surface is not greater than the height of the reflecting flanged edge;

Feature E: the radial distance between the chord A and the center of circle is not smaller than 0.3 D, wherein, D is the diameter length of the microwave agitating plate.

Preferably, the agitating assembly further comprises an agitating support, which comprises a cylindrical sleeve and a plurality of claws that are arranged at an interval in the circumferential direction of the periphery of the cylindrical sleeve and extend outward, the microwave agitating plate has a central mounting hole and a plurality of snap slots arranged around the central mounting hole, the cylindrical sleeve of the agitating support is inserted in the central mounting hole, and the plurality of claws are snap-fitted in corresponding snap slots respectively;

Wherein, a square inner hole is formed in the bottom of the cylindrical sleeve, the agitating motor comprises a square output shaft, and the square output shaft is embedded in the square inner hole.

With the technical scheme described above, the microwave rice cooker provided in the present application integrates the advantages of a microwave oven and a rice cooker, and employs a cooking chamber and a top door assembly of a rice cooker and the microwave heating principle and microwave matching technique of a microwave oven; an inner pot through which microwave energy can be transmitted may be arranged in the cooking chamber, and the food placed in the inner pot can be heated uniformly by means of microwaves, so as to realize rice cooking, soup cooking, and congee cooking, etc.; a shelf for receiving articles to be heated may be arranged on the bottom of the cooking chamber; a microwave oven heating function can be realized by means of microwave heating; wherein, in view that conventional waveguide assembly can't be mounted in the lateral direction owing to the small volume of the cavity and the arc-shaped side walls, the microwave transmitting mechanism is arranged in the bottom part of the microwave rice cooker, and the composition of the waveguide assembly and the design of the microwave transmission cavity are optimized. Thus, the waveguide assembly is smaller in size and compact in structure, the microwave transmission distance is shorter, the design of the microwave transmission cavity is more reasonable, and thereby efficient transmission of microwave energy and excellent microwave matching in the cavity of the assembly are realized. Besides, the microwave agitating plate is designed into a disc shape accordingly and is arranged in the space between the bottom cap and the shelf so that the microwaves can be agitated intensively; the agitating motor and the waveguide assembly, etc. are mounted below the bottom cap. Thus, the overall structural layout is compact and reasonable; compared with conventional square microwave ovens, the microwave oven in the present application is compact in size, and has a smaller cavity, attractive appearance, and higher portability. Furthermore, based on the characteristics of the cooking chamber, the microwave agitating plate is designed specially; specifically, rectangular holes are arranged so that microwaves can be transmitted vertically, an arc chord part is formed on the agitating plate, an opening is formed by means of a notch on the arc chord part so that microwaves can be transmitted in the transverse direction, the inclined flat reflecting surface of the arc chord part and the reflecting flanged edges of the rectangular holes are configured to reflect microwaves, so that the microwaves that enter into the cooking chamber are dispersed more uniformly, the food on the shelf can be heated more uniformly, and the microwave heating efficiency is improved as well.

Other features and advantages of the present application will be further detailed in the embodiments hereunder.

BRIEF DESCRIPTION OF DRAWINGS

The accompanying drawings are provided here to facilitate further understanding on the present application, and constitute a part of this document. They are used in conjunction with the following embodiments to explain the present application, but shall not be comprehended as constituting any limitation to the present application. In the figures.

Figure 1:
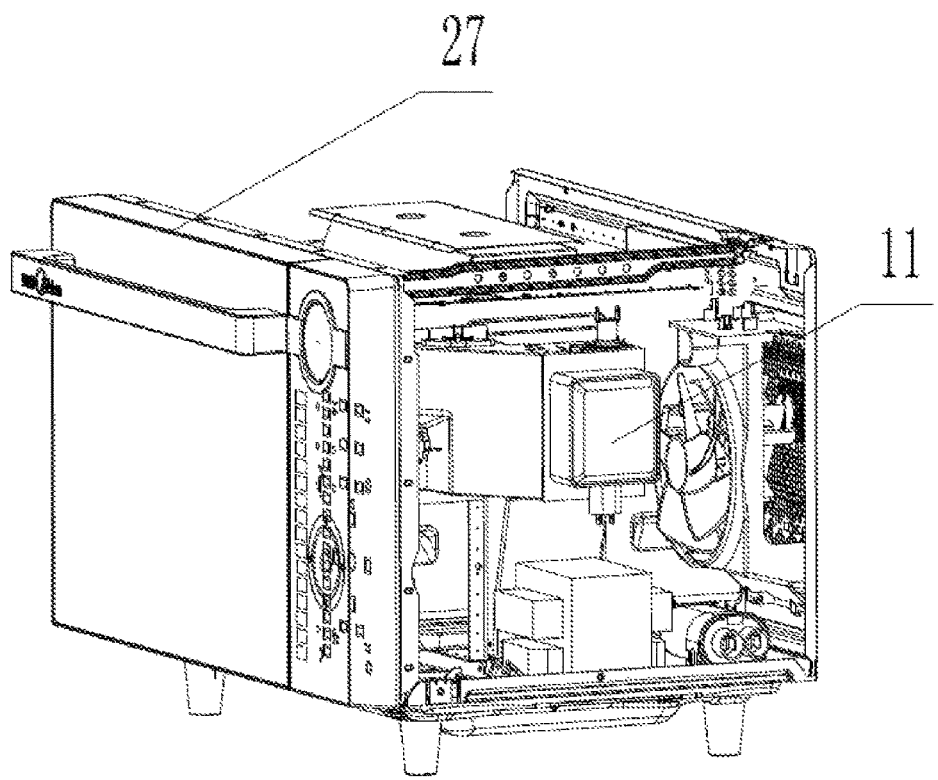
FIG. 1 is a schematic structural diagram of a microwave oven in the prior art, with the enclosure of the microwave oven omitted partially to present the internal structure more clearly.

| Brief Description of Symbols | | | |
|---|---|---|---|
| 1 | top cap | 2 | cavity |
| 3 | shelf | 4 | microwave agitating plate |
| 5 | bottom cap | 6 | waveguide assembly |
| 7 | agitating motor | 8 | agitating support |
| 9 | microwave feed inlet | 10 | microwave outlet |
| 11 | magnetron | 12 | microwave inlet |
| 13 | angle iron piece | 14 | welded connecting plate |
| 15 | hole with flanged edge | 16 | spherical groove |
| 17 | circumferential enclosure | 18 | base |
| 19 | cooling fan | 20 | inner pot |
| 21 | frequency converter | 22 | hinge mechanism |
| 23 | interlocking mechanism | 24 | control panel assembly |
| 25 | door hook | 26 | door panel |
| 27 | door body | 28 | door seal |
| 29 | seal ring | 41 | chord A |
| 42 | inclined flat reflecting surface | 43 | chord B |
| 44 | upper arc chord surface | 45 | transverse opening |
| 46 | snap slot | 47 | first rectangular hole |
| 48 | second rectangular hole | 49 | reflecting flanged edge |
| 61 | base plate | 62 | cover plate |
| 63 | microwave transmission cavity | 64 | motor support |
| 71 | square output shaft | 81 | claw |
| 221 | pivot shaft | 222 | torsion spring |
| 611 | first transverse base plate | 612 | downward extension plate |
| 613 | second transverse base plate | 614 | flanged base plate edge |
| 621 | transverse cover plate | 622 | longitudinal cover plate |
| O | center of circle | O' | vertex of triangle |
| a, b | included angle | D | disc diameter |
| H | flanged height | H1 | height of flanged edge |
| J | chord-center distance | L1 | length of flanged edge |
| L | length of longer side | Q | length of cut side |
| W | width of shorter side | | |

DETAILED DESCRIPTION OF THE EMBODIMENTS

Hereunder some embodiments of the present application will be detailed with reference to the accompanying drawings. It should be understood that the embodiments described here are only provided to describe and explain the present application, but shall not be deemed as constituting any limitation to the present application.

In the present application, unless otherwise specified, the terms of locality, such as "upper", "lower", "top", "bottom", and "longitudinal", etc., are words that describe the positional relation among components and are usually defined in relation to the directions indicated in the accompanying drawings or in relation to vertical or gravity direction; "transverse" is usually defined in relation to the left-right direction of the sheet surface of the accompanying drawings; "inside and outside" usually refer to inside and outside in relation to the chamber or inside and outside in the radial direction in relation to the center of circle.

As shown in FIGS. 3-8, the present application provides a novel microwave rice cooker, which comprises a cavity structure, a door assembly and an inner pot 20 through which microwaves can be transmitted (usually is made of a non-metal material, but is not limited to non-metal materials). The cavity structure comprises a microwave transmitting mechanism, a cavity 2 provided with a cooking chamber (usually is in a cylindrical shape, but is not limited to that) therein, and a top cap 1 and a bottom cap 5 located at two ends of the cooking chamber respectively; the bottom cap 5 encloses the cooking chamber at the bottom, a top opening of the cooking chamber is formed on the top cap 1, and the inner pot 20 can be put into or taken out of the cooking chamber through the top opening; wherein, the door assembly is mounted on the top cap 1 in an openable and closable manner so as to open or close the cooking chamber from the top, and the microwave transmitting mechanism is mounted at the bottom of the bottom cap 5 to feed microwaves into the cooking chamber from the bottom.

The microwave rice cooker provided in the present application integrates the functions of a microwave oven and a rice cooker. There is no microwave heating product that has such a cylindrical (or columnar) microwave cavity in the market yet at present. The microwave rice cooker has top door assembly structure of an electric rice cooker, built-in cooking chamber and inner pot 20, the food to be heated can be placed into the microwave rice cooker conveniently, and the microwave rice cooker is in line with the habits of operation of a rice cooker; the cylindrical cooking chamber is also beneficial for microwave heating and more uniform distribution of microwaves, resulting in higher heating efficiency and quicker and more uniform heating. In addition, the microwave transmitting mechanism feeds microwaves from the bottom for microwave heating, the microwave heating principle and microwave matching technique of a microwave oven are utilized, the microwaves fed into the cylindrical cooking chamber can directly heat up the food placed in the inner pot 20 through the inner pot 20; thus, the functions of a rice cooker (e.g., rick cooking, soup cooking, and congee cooking, etc.) and the heating function of a conventional microwave oven are realized.

Figure 8:
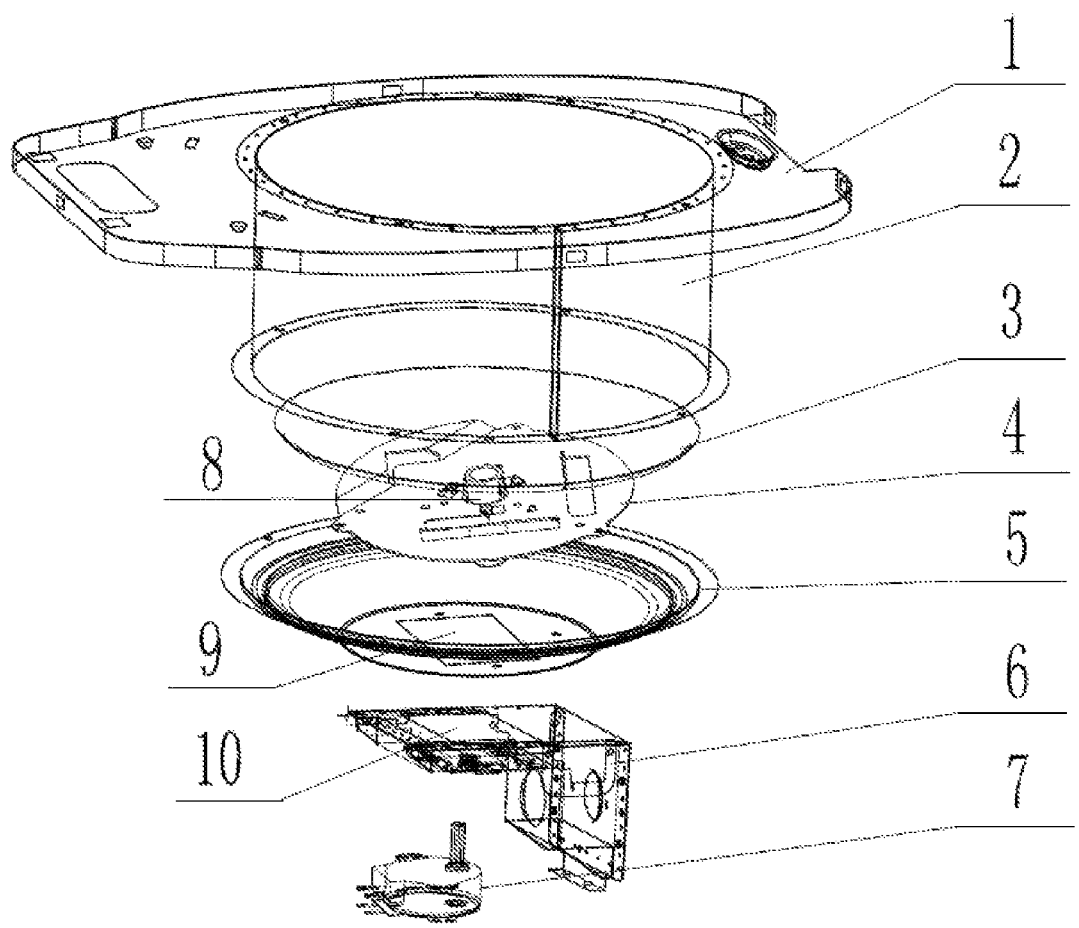
FIG. 8 is an exploded view of the cavity structure of the microwave rice cooker shown in FIG. 6.
Figure 9:
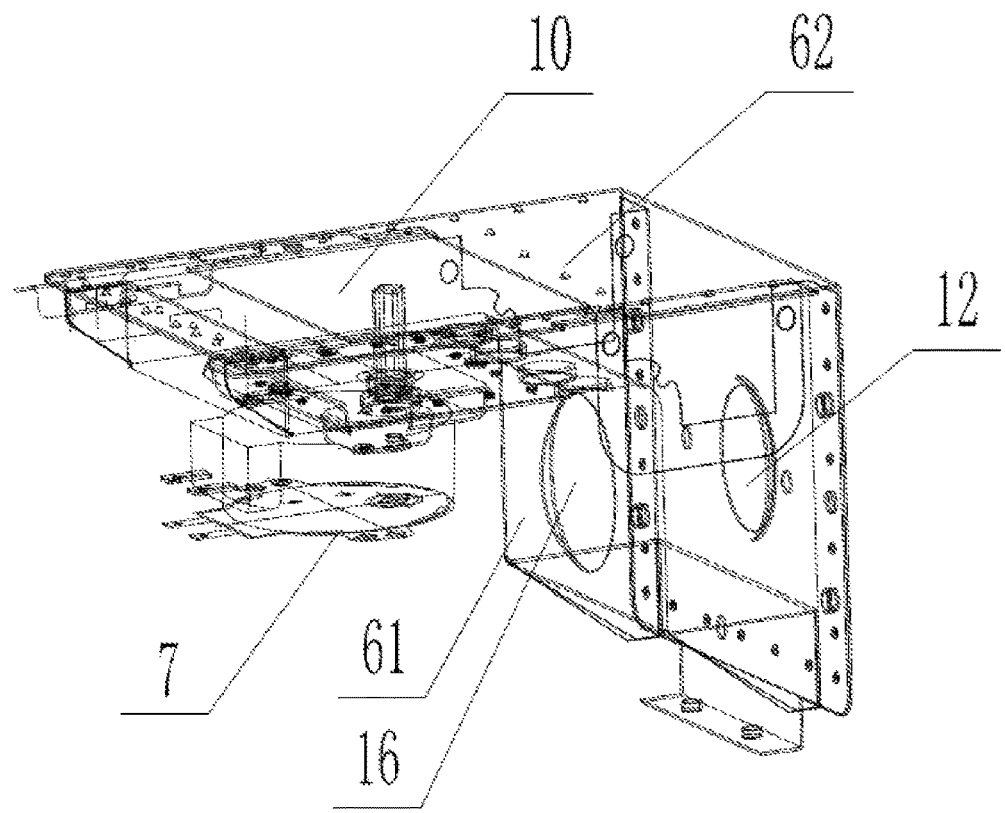
FIG. 9 is a schematic structural diagram of a waveguide assembly suitable for used in the microwave rice cooker according to a preferred embodiment of the present application.

Of course, a shelf 3 for receiving articles to be heated can be arranged in the bottom part of the cooking chamber, such as disc-shaped ceramic plate, plastic plate or glass plate, etc.; thus, the heating function of a microwave oven can be realized by virtue of microwave heating. Both of the shelf 3 and the inner pot 20 may be made of common ceramic, plastic, or glass material, etc., which can transmit microwaves but will not be heated up by the microwaves. Specifically, a cylindrical cooking chamber is employed in this embodiment and the bottom cap 5 is designed into a disc shape accordingly; as shown in FIG. 8, a recessed profiled space is formed on the inner side of the bottom cap 5 in relation to the cooking chamber, one or more circumferential stepped parts are arranged in the profiled space, and the above-mentioned shelf 3 can be placed on the circumferential stepped parts. Therefore, the shelf 3 can be supported stably, and can be accessed conveniently. More preferably, the inner pot 20 embedded in the cooking chamber can be borne on the shelf 3 securely. Of course, it can be conceived that the inner pot may be fixed in a different way alternatively. For example, the top edge of the inner pot 20 is bent downward and thereby can be snap-fitted in an annular snap slot in the cavity 2 that is designed accordingly.

Figure 2:
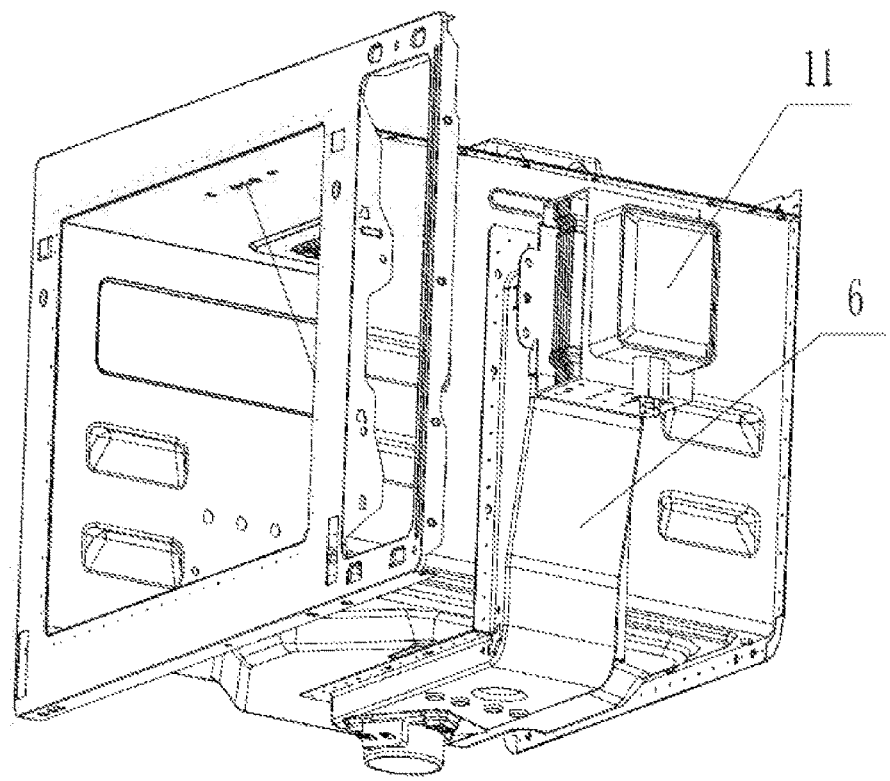
FIG. 2 is similar to FIG. 1, but shows more clearly the magnetron and waveguide assembly that are assembled laterally.
Figure 7:
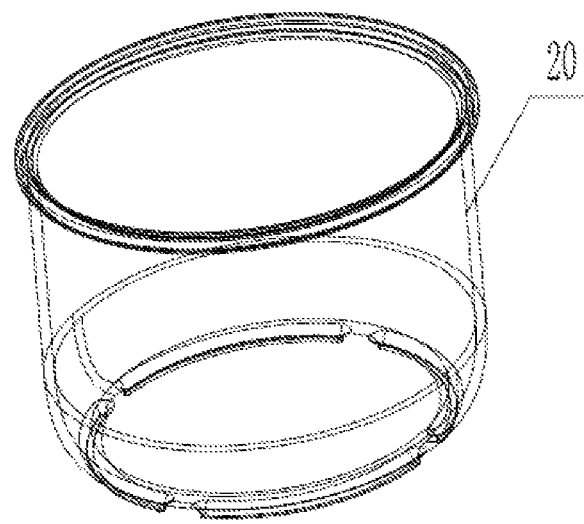
FIG. 7 shows an inner pot to be placed into the cylindrical cooking chamber of the microwave rice cooker shown in FIG. 3.

Please see FIG. 2. As an example, the cavity 2 may comprise a metal cylindrical plate that prevents microwave transmission, the inner cylindrical cavity of the cylindrical plate forms the cooking chamber, and the cylindrical plate preferably is made of a galvanized sheet, tinned sheet, or stainless steel sheet. The top circumference of the cylindrical plate may be connected to the top cap 1 by welding or embedding, etc., the bottom circumference of the cylindrical plate may be hermetically connected to the inner side wall of the bottom cap 5, and the top cap 1, the cylindrical plate, and the bottom cap 5 are metal covers that prevent microwave transmission, so that the microwaves in the cooking chamber can't be radiated out. In the illustrated embodiment, the inner diameter of the cylindrical cavity is 230 mm-260 mm; the height of the cylindrical cavity is 105 mm-135 mm; wherein, preferably the diameter of the inner pot 20 shown in FIG. 7 is smaller than the diameter of the cylindrical plate, for example, smaller by at least 15 mm, e.g., 20 mm or 30 mm, etc.; thus, the inner pot 20 can be placed into or taken out of the cooking chamber conveniently, and the microwaves in the cooking chamber can be refracted and reflected repeatedly on the inner wall of the cylindrical plate so that the inner pot 20 is heated uniformly, owing to the annular clearance between the inner pot 20 and the cylindrical plate.

Figure 4:
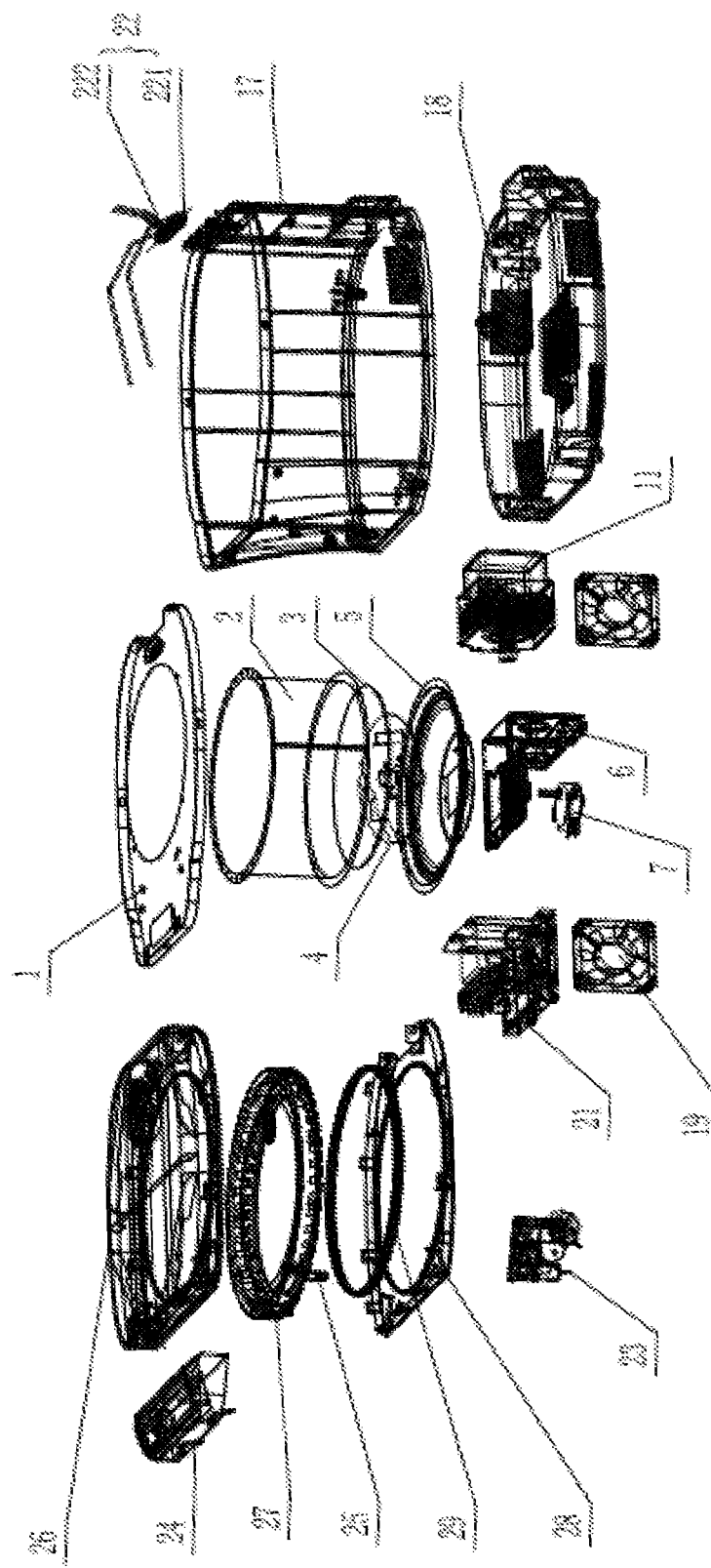
FIG. 4 is an assembly diagram of the microwave rice cooker shown in FIG. 3.

Please see FIG. 4. In this embodiment, a first end of the door assembly (the right end in the figure) is hinged to a first end of the top cap 1 (the right end in the figure) via a hinge mechanism 22, an interlocking mechanism 23 is arranged and a box-shaped control panel assembly 24 is mounted at a second end of the top cap 1 (the left end in the figure), the top cap 1 is designed to extend essentially in the transverse direction in the figure, a door hook 25 is arranged at a second end of the door assembly, and the door assembly can be rotated around the hinge mechanism 22 so as to enter into a closed state in which the cooking chamber is closed or an open state in which the cooking chamber is opened; wherein, in the closed state, the door assembly covers the top surface of the top cap 1, the door hook 25 penetrates through a corresponding through-hole arranged in a door seal 28 shown in FIG. 5 and then is locked to the interlocking mechanism 23, and the interlocking mechanism 23 transmits a door close signal to the control panel assembly 24, the control panel assembly 24 receives the door close signal and is triggered to an active state; in the open state, the interlocking mechanism 23 transmits a door open signal, and the control panel assembly 24 is switched to an inactive state according to the door open signal. With the exemplary interlock design, the microwave rice cooker can be started for microwave heating when and only when the door assembly is fully closed so that the microwaves are confined in the cooking chamber and can't be radiated out.

Furthermore, the hinge mechanism 22 may further comprise a torsion spring 222 outside of a pivot shaft 221, the pivot shaft 221 is mounted on the first end of the top cap 1, the door assembly can be pivoted around the pivot shaft 221, the torsion spring 222 is fitted over the pivot shaft 221, and the two ends of the torsion spring 222 are resiliently biased on the door assembly and the top cap 1. Thus, the door assembly can be opened resiliently and operated conveniently. Of course, it is understood that the hinging form and structure between the door assembly and the top cap 1 are not limited to those in this embodiment, and the interlocking mechanism 23 here is well known by those skilled in the art, and will not be further detailed here. During the operation, the door hook 25 will be inserted into the interlocking mechanism 23 and locked there naturally when the door assembly is closed to a proper position. The interlocking mechanism 23 is usually provided with an unlock button that can be pressed to release the door assembly automatically.

Figure 5:
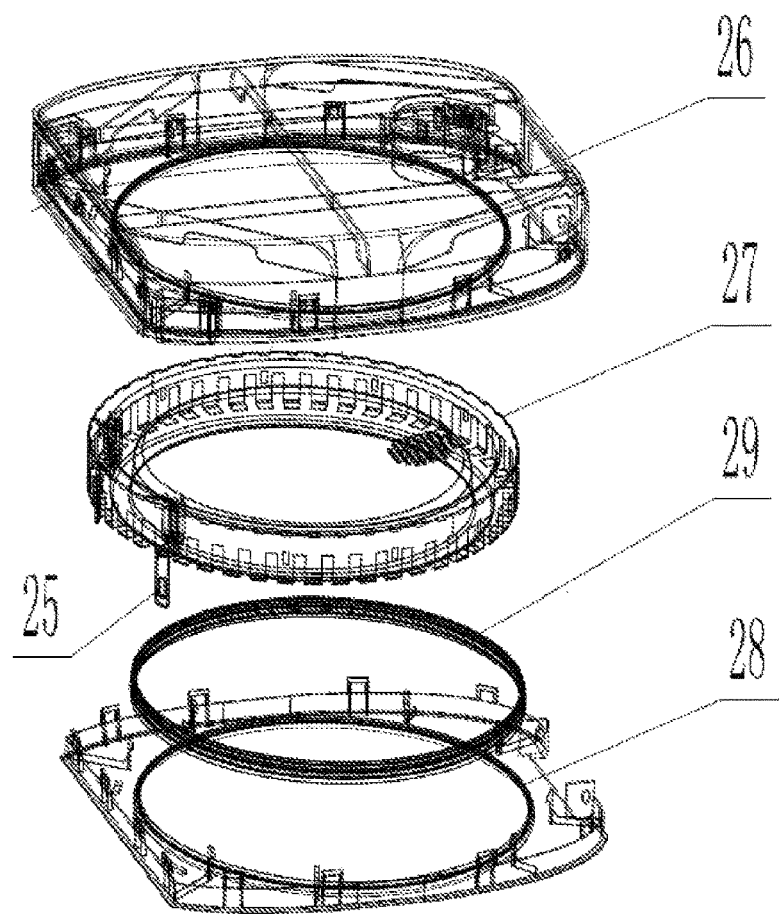
FIG. 5 is a schematic structural diagram of the door assembly in the microwave rice cooker shown in FIG. 3.

As shown in FIG. 5, the door assembly in this embodiment comprises a door panel 26, a door body 27, and a door seal 28 that are engaged sequentially from outer side to inner side, the door panel 26 and the door body 27 include a metal plate configured to seal the cooking chamber to prevent transmission of microwaves therein, the door hook 25 extends downward from the door body 27, and the door seal 28 is lined between the door body 27 and the top cap 1 to seal the cooking chamber when the door assembly is in the closed state. Wherein, the door body 27 preferably is a metal structural member that attains a structural support effect and prevent microwaves from transmitted out, the door panel 26 attains a decorative effect, and shall be arranged with vent holes or the like so that the vapor can be discharged conveniently when the microwave oven is used as a rice cooker; here, to maintain the air pressure in the cavity, prevent water vapor from intruding into the door body 27 and buffer external impact, etc., a seal ring 29 (e.g., a rubber ring) or the like may be arranged between the door body 27 and the door seal 28.

Figure 3:
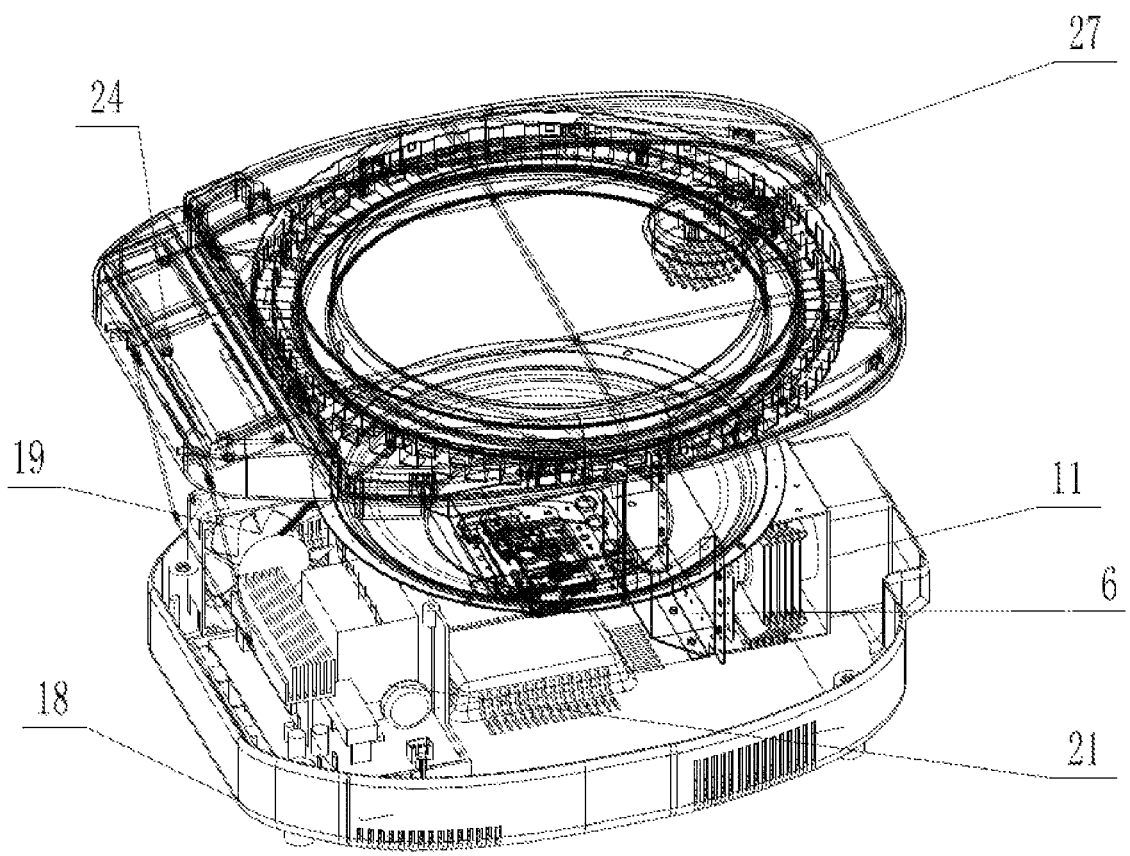
FIG. 3 is a schematic structural diagram of the microwave rice cooker according to a preferred embodiment of the present application, with the circumferential enclosure of the microwave rice cooker omitted in order to present the internal structure more clearly.

Besides the door assembly arranged at the top of the cavity, the microwave rice cooker may further comprise a circumferential enclosure 17 and a base 18, wherein, the bottom of the cavity structure is mounted on the base 18, the circumferential enclosure 17 is arranged around the cavity 2 to fix and support the cavity structure in the circumferential direction, the top of the circumferential enclosure 17 may be fixedly connected to the top cap 1, for example, by means of fasteners or screws, etc., and the bottom of the circumferential enclosure 17 may be connected to the base 18 in a similar way, so that the appearance similar to a rice cooker shown in FIG. 3 is formed. Moreover, in view that the microwave transmitting mechanism is arranged in the bottom part of the cavity and the magnetron 11 of the microwave transmitting mechanism and the frequency converter 21 connected with the magnetron 11 to regulate the supply voltage of the magnetron 11 are heat generating units and generate high heat locally, one or more cooling fans 19 may be arranged accordingly on the base 18 to realize forced convection cooling.

Figure 6:
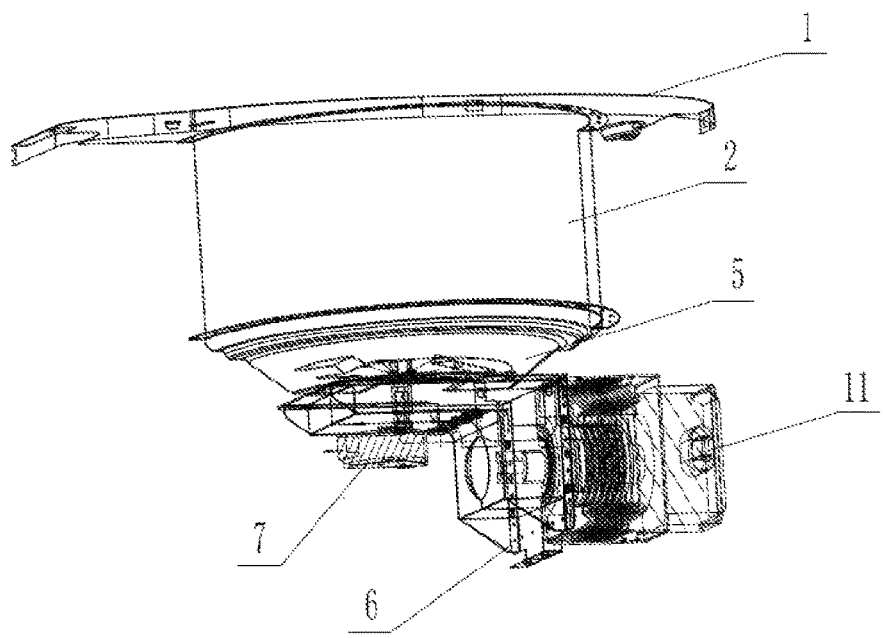
FIG. 6 is a schematic structural diagram of the cavity structure of the microwave rice cooker according to a preferred embodiment of the present application.

The basic functional composition and appearance structure of the microwave rice cooker are described above. Hereunder the microwave transmitting mechanism and the microwave agitating assembly specially designed to adapt to the cylindrical cooking chamber in this embodiment and the special cavity structure formed on that basis as shown in FIG. 6 for the purpose of intensive microwave agitation, utilization, and uniform and efficient heating will be introduced.

In the present application, the conventional strip-shaped waveguide assembly that is curved laterally to the bottom as shown in FIG. 2 is difficult to adapt to the cylindrical microwave rice cooker in the present application, because the cylindrical chamber structure is small in size and has a cylindrical side wall, and it is difficult to weld the waveguide assembly to the cylindrical surface; in addition, since the magnetron has to be mounted in the lateral direction of the cylindrical chamber structure, the radial dimension of the microwave rice cooker will be too great. Moreover, as described above, variety problems related with microwave transmission may occur if the microwave transmission cavity is too long.

Hence, as shown in FIGS. 6 and 8-12, the present application further provides a microwave transmitting mechanism specially used for the microwave rice cooker. The microwave transmitting mechanism comprises a waveguide assembly 6 and a magnetron 11, wherein, the waveguide assembly 6 comprises a transverse part and a downward extension part that extends downward from the transverse part, the magnetron 11 is mounted on the downward extension part, and the magnetron 11 inputs microwaves via a microwave inlet 12 to a microwave transmission cavity 63 in the waveguide assembly 6, the transverse part is arranged with a microwave outlet 10, the bottom of the bottom cap 5 is arranged with a microwave feed inlet 9, the transverse part is connected to the bottom of the bottom cap 5 so that the microwave outlet 10 abuts against the microwave feed inlet 9 to feed microwaves into the cooking chamber.

In the present application, the microwaves generated by the magnetron 11 enters into the microwave transmission cavity 63 via magnetron antenna heads (not shown) inserted in the microwave inlet 12, oscillate and match in the microwave transmission cavity 63; then, the microwaves are fed from one end of the waveguide assembly 6 (i.e., the transverse part) via the microwave outlet 10 and the microwave feed inlet 9 into the microwave rice cooker from the bottom of the microwave rice cooker. The other end of the waveguide assembly 6 is not curved upward to the side wall of the cavity and mounted and fixed there; instead, it extends downward and forms a downward extension part, which can be mounted to the base 18. In that way, the problems of difficult welding operation and over-sized microwave rice cooker are solved, and the transmission path of the microwave transmission cavity 63 is shorter. Wherein, in the case that the bottom cap 5 is in a disc shape, in the radial direction of the bottom cap 5, the outer end of the waveguide assembly 6 preferably is located within the circumferential edge of the bottom cap 5, so that the radial dimension of the circumferential enclosure 17 is minimized.

Figure 10:
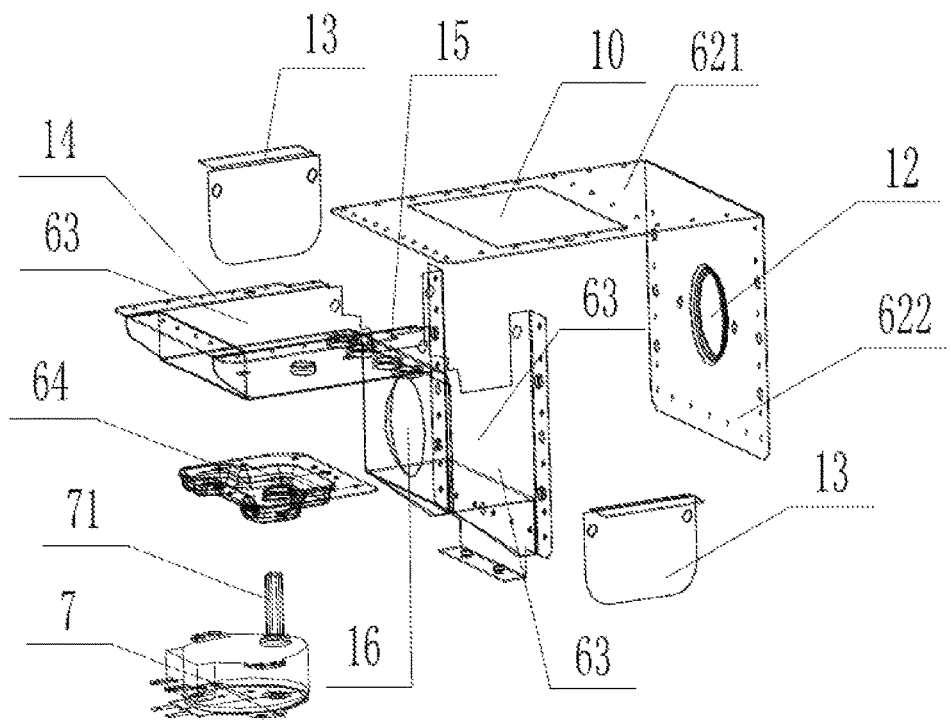
FIG. 10 is an exploded view of the waveguide assembly shown in FIG. 9.
Figure 11:
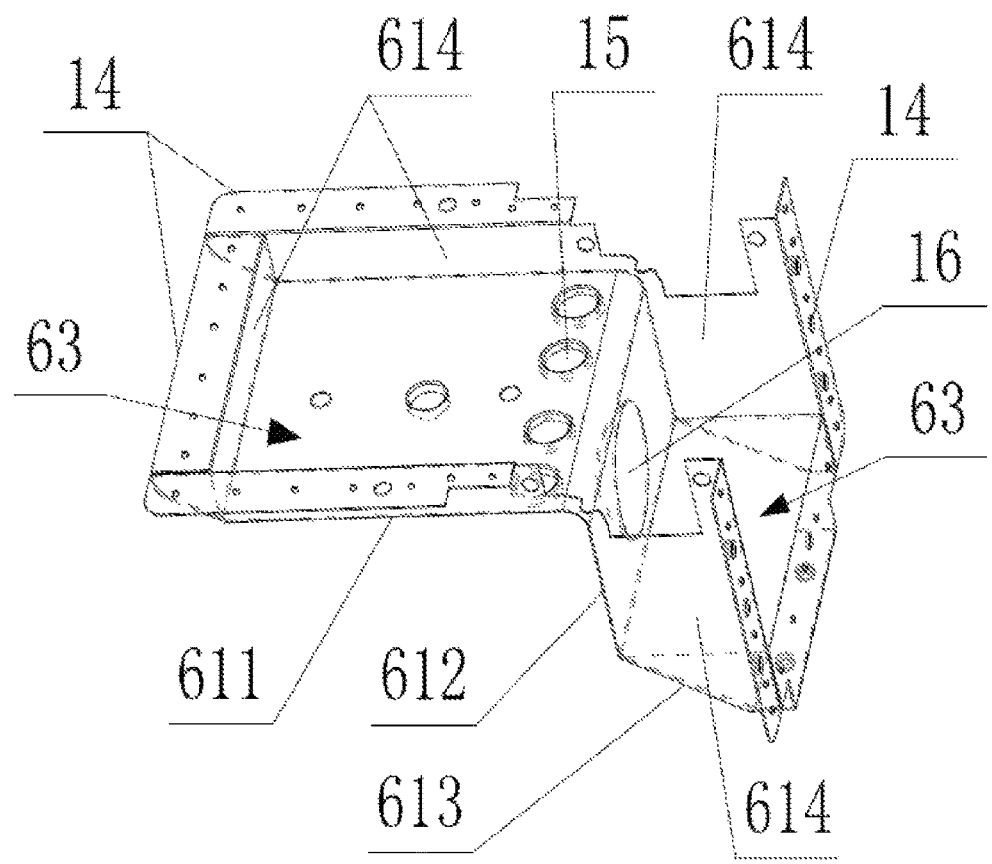
FIG. 11 is a 3D view of the base plate of the waveguide assembly shown in FIG. 9.
Figure 12:
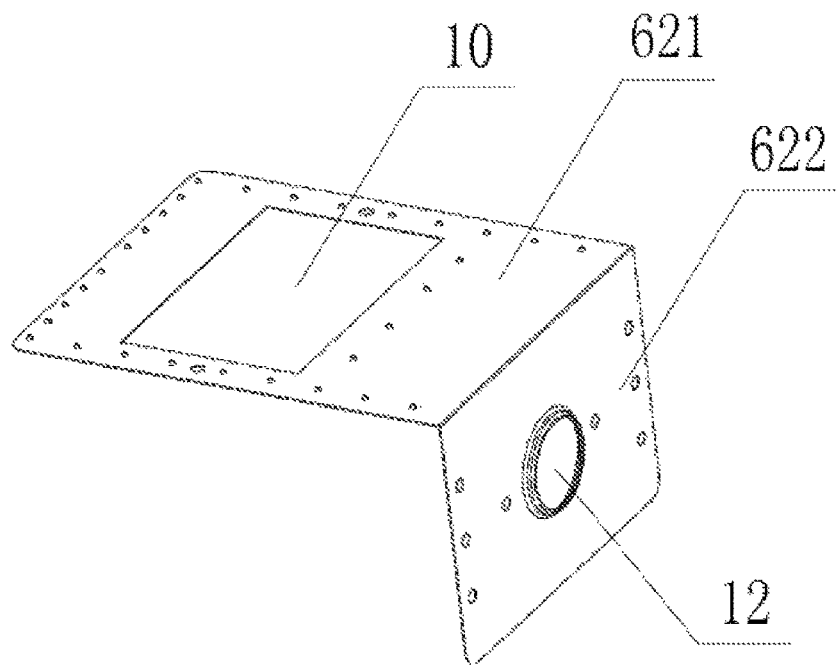
FIG. 12 is a 3D view of the cover plate of the waveguide assembly shown in FIG. 9.

To attain a better oscillation, matching and transmission effect of the microwaves in the microwave transmission cavity 63 and facilitate manufacturing, the structure of the waveguide assembly 6 in the present application is optimized. As shown in FIGS. 10-12, the waveguide assembly 6 comprises a base plate 61 and a cover plate 62, the cover plate 62 is in an "L" shape and comprises a transverse cover plate 621 and a longitudinal cover plate 622, the base plate 61 is in a "Z" shape and comprises a first transverse base plate 611, a downward extension plate 612, and a second transverse base plate 613 arranged sequentially, flanged base plate edges 614 are formed on the periphery of the base plate 61, and the cover plate 62 hermetically covers the flanged base plate edges 614 of the base plate 61 to form the microwave transmission cavity 63 between the base plate 61 and the cover plate 62;

Wherein, the transverse cover plate 621 is arranged above the first transverse base plate 611 so as to form a transverse chamber of the microwave transmission cavity 63 between the transverse cover plate 621 and the first transverse base plate 611, the longitudinal cover plate 622 is spaced from the downward extension plate 612 in the transverse direction and the bottom of the longitudinal cover plate 622 extends downward till it is engaged with the second transverse base plate 613 to form a longitudinal chamber of the microwave transmission cavity 63 among the downward extension plate 612, the second transverse base plate 613, and the longitudinal cover plate 622, the microwave outlet 10 is arranged on the transverse cover plate 621, and the microwave inlet 12 is arranged on the longitudinal cover plate 622. Of course, in the cavity structure shown in FIG. 6, if no agitating motor 7 is provided, the microwave inlet 12 may be arranged on the downward extension plate 612 alternatively, i.e., the magnetron 11 is mounted on the left side of the downward extension plate 612.

Apparently, in structural composition, the waveguide assembly 6 is preferably composed of two plates simply. Namely, the base plate 61 is a single plate that is formed by bending and has flanged edges at the four sizes; in other words, the flanged base plate edges 614 and the "Z" shaped plate form an integral single plate, and the cover plate 62 may be simply bent into an "L" shape. Thus, the material selection is easy, and the manufacturing is convenient. Wherein, the downward extension plate 612 and the longitudinal cover plate 622 are preferably parallel to each other and extend downward vertically, to form an attractive appearance and facilitate microwave reflection, oscillation and matching. When the base plate 61 made of a single plate is bent to form flanged edges, the flanged base plate edges 614 may be stretched or create gaps easily at the corners where the transverse chamber and the longitudinal chamber of the microwave transmission cavity 63 communicate with each other, as shown in FIG. 10. In view of that problem, the waveguide assembly 6 further comprises two or more angle iron pieces 13 configured to seal the microwave transmission cavity 63 in the lateral direction. The angle iron pieces 13 are mounted to the corners to shield microwaves and improve structural strength of the assembly.

In this embodiment, the base plate 61 and the cover plate 62 are welded together, a welded connecting plate 14 is arranged on the flanged base plate edges 614 along the entire circumference, and the cover plate 62 is closed and welded to the welded connecting plate 14. In view that the entire waveguide assembly 6 has to be welded to the bottom cap 5 via the transverse cover plate 621, a plurality of holes with flanged edge 15 that penetrate through the first transverse base plate 611 are arranged in the first transverse base plate 611 near the end of the downward extension plate 612, to provide support and facilitate welding. Wherein, the hole with flanged edge 15 has a downward circumferential flanged edge, and the height of the downward flanged edge of the circumferential flanged edge preferably is not smaller than 2 mm, so that the microwaves in the microwave transmission cavity 63 will not be radiated out through the holes with flanged edge 15. In addition, in view that the antenna heads of the magnetron are inserted into the longitudinal chamber of the microwave transmission cavity 63 to a great depth, a spherical groove 16 opposite to the microwave inlet 12 is preferably formed on the inner side wall of the downward extension plate 612, and the outer wall of the spherical groove 16 protrudes outward to separate the antenna heads of the magnetron 11 and increase spacing.

To realize excellent oscillation and matching of the microwaves in the microwave transmission cavity 63, attain a good microwave transmission effect between the longitudinal chamber and the transverse chamber and facilitate mounting of the magnetron 11, the volume ratio of the longitudinal chamber to the transverse chamber of the microwave transmission cavity 63 preferably is not smaller than 2, and the length of the longitudinal cover plate 622 in the longitudinal direction preferably is not greater than 1.5 times of the length of the magnetron 11 in the longitudinal direction.

In the illustrated embodiment, the microwave outlet 10 on the cover plate 62 is designed into a square opening in 80 mm length and 50 mm-80 mm width, and the microwaves are exported through the square opening. The distance from the center of the square opening to the right side of the transverse cover plate 621 is 70 mm-80 mm, the aperture of the microwave inlet 12 matches the magnetron antenna heads, and the height from the center of the microwave inlet 12 to the top of the longitudinal cover plate 622 is 38-42 mm. On the base plate 61, the total length in the transverse direction (including the total length of transverse chamber and longitudinal chamber in the transverse direction) is 120-130 mm, the space height of the transverse chamber is 15-20 mm, the space height of the longitudinal chamber is 58-65 mm, and the length of the longitudinal chamber in the transverse direction (i.e., the spacing between the downward extension plate 612 and the longitudinal cover plate 622 in the transverse direction) is 32-46 mm; the width of the base plate 61 is close to the width of the cover plate 62, and is about 80 mm. There are four holes with flanged edge 15, the diameter of each hole with flanged edge is 8 mm-10 mm, and the height of the downward flanged edge of the hole with flanged edge 15 is 2 mm-3 mm. To facilitate microwave transmission from the longitudinal chamber to the transverse chamber, a chamfer in 5-12 mm radius is arranged between the first transverse base plate 611 and the downward extension plate 612.

After the microwaves are fed through the waveguide assembly 6 into the cylindrical microwave cavity, the uniformity of microwave distribution must be further improved to realize uniform and quick heating. To that end, the microwaves are intensively agitated by means of a microwave agitating element. Since such a cylindrical microwave chamber hardly exists in the prior art, surely it is difficult to discover an agitating element or structure that matches the cylindrical microwave cavity. To meet that demand, as shown in FIGS. 8 and 13-17, the present application provides a microwave agitating plate 4 and a microwave electric apparatus having the microwave agitating plate 4 accordingly, for example, the microwave rice cooker shown in figures or the like.

As a product of a new concept, the microwave rice cooker has elegant appearance, and is completely different from existing square microwave ovens. Since the cylindrical cooking chamber is smaller and in a cylindrical shape, the conventional microwave agitating assemblies can't match the cylindrical cooking chamber; in addition, an assembling relation among many microwave assemblies must be optimized and established. As described above, a shelf 3 may be arranged in the bottom part of the cylindrical cooking chamber in the present application to receive the food to be heated, the microwaves enter into the cylindrical cooking chamber from the bottom of the cylindrical cooking chamber, the space between the bottom cap 5 and the shelf 3 may be reserved as a microwave agitation space, the microwave agitating plate 4 is designed into a disc shape accordingly, and is arranged in the microwave agitation space accordingly to agitate the microwaves intensively.

The microwave agitating plate 4 is usually a metal plate, the agitating motor 7 that drives the microwave agitating plate 4 and other waveguide assemblies that generate and transmit microwaves are mounted below the bottom cap 5, and may be supported on the base 18. Wherein, the bottom cap 5 provides structural support for the microwave agitating plate 4 when the microwave agitating plate 4 is mounted, and the top cap 1, the cavity 2, and the bottom cap 5 attain an effect of sealing the cooking chamber to prevent leakage of the microwaves.

Figure 13:
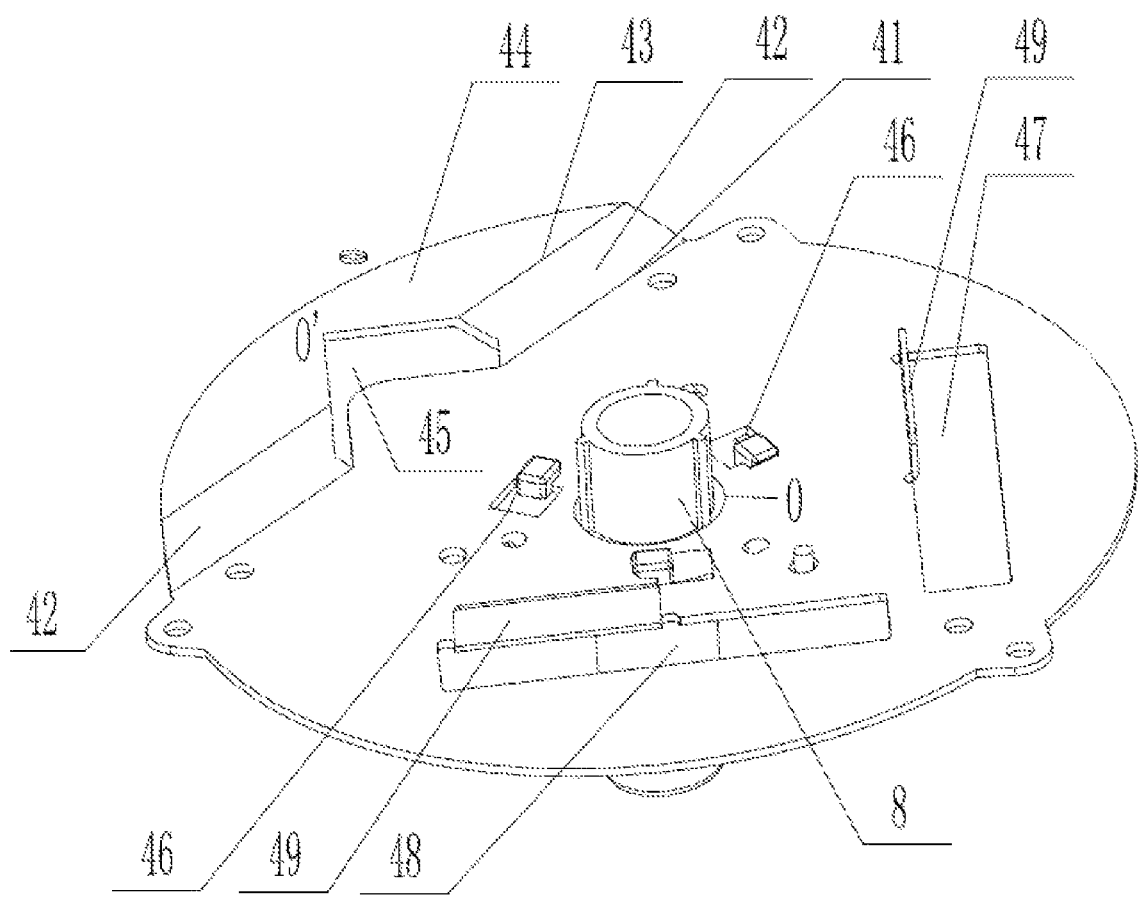
FIG. 13 is a 3D structural diagram of the microwave agitating plate according to a preferred embodiment of the present application.
Figure 14:
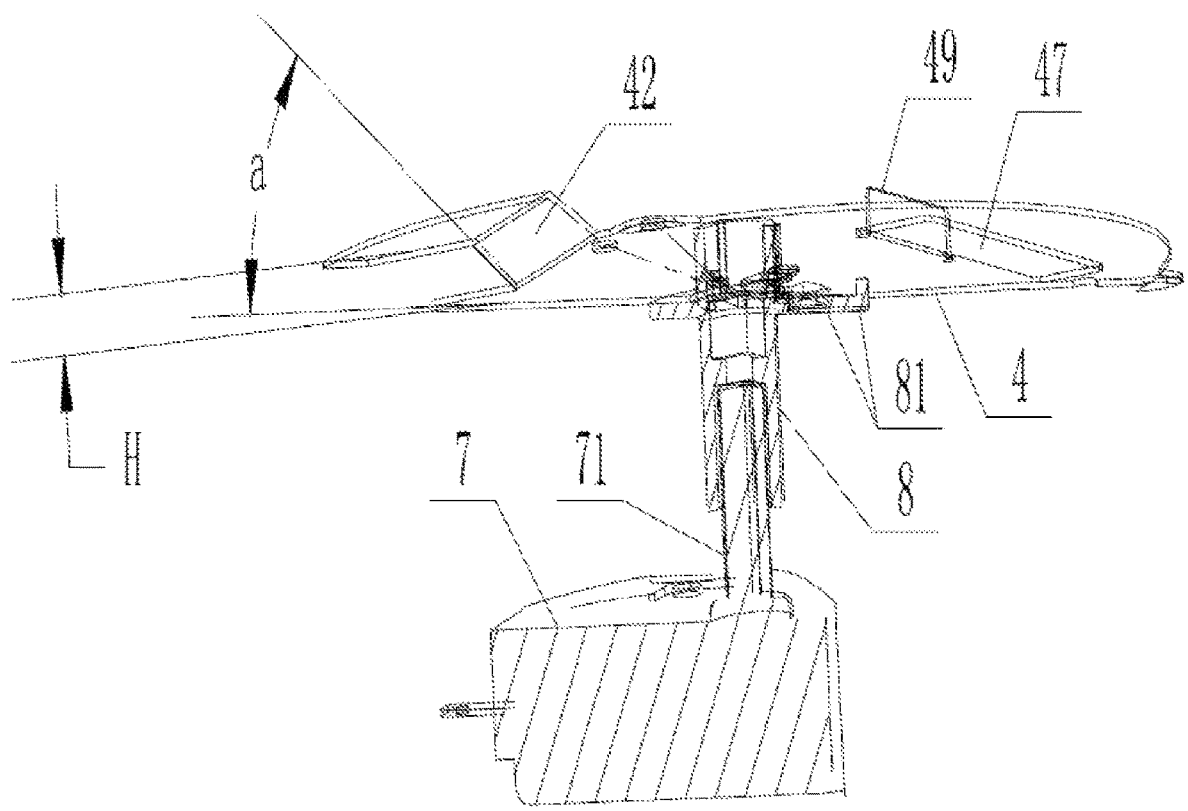
FIG. 14 is a semi-sectional view of the microwave agitating plate in FIG. 13 assembled with an agitating motor.
Figure 15:
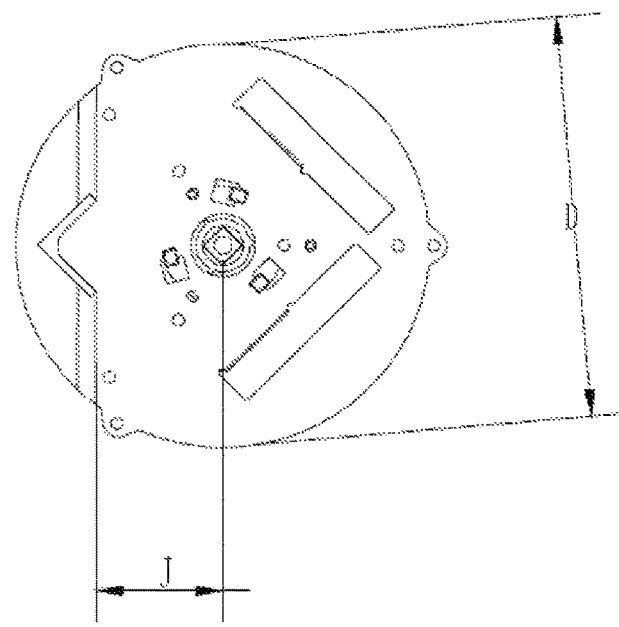
FIGS. 15-17 are schematic structural diagrams of the microwave agitating plate shown in FIG. 13, illustrating the dimensions and positional relation among the parts of the microwave agitating plate.

The mounting and supporting structure for the microwave agitating plate 4 is described hereunder before the structure of the microwave agitating plate 4 is presented. As shown in FIGS. 13 and 14, the microwave rice cooker comprises an agitating support 8, which comprises a cylindrical sleeve and a plurality of claws 81 that are arranged at an interval in the circumferential direction of the periphery of the cylindrical sleeve and extend outward, the microwave agitating plate 4 has a central mounting hole and a plurality of snap slots 46 arranged around the central mounting hole, the cylindrical sleeve of the agitating support 8 is inserted in the central mounting hole, and the plurality of claws 81 are snap-fitted in corresponding snap slots 46 respectively; in addition, a square inner hole is formed in the bottom of the cylindrical sleeve, the agitating motor 7 comprises a square output shaft 71, and the square output shaft 71 is embedded in the square inner hole. In other words, the agitating support 8 is engaged with the microwave agitating plate 4 by snap fitting, the agitating motor 7 is connected via the agitating support 8 and drives the microwave agitating plate 4 to rotate so as to execute agitation. By means of snap fitting, the agitating support 8 is engaged with the microwave agitating plate 4 tightly, and can be assembled and disassembled more conveniently; the square shaft hole fitting between the agitating support 8 and the agitating motor 7 also facilitate assembling and disassembling, and can avoid slipping in the circumferential direction; thus, the driving and rotation are stable. Of course, the illustrated embodiment is only an exemplary one. Those skilled in the art know that there are a variety of other conventional designs for the shape and structure of the agitating support 8 and the connection structure between the agitating support 8 and the agitating motor 7 or the microwave agitating plate 4. For example, the agitating support 8 and the microwave agitating plate 4 may be designed as an integral structure, etc.

As described above, owing to the unique cooking chamber shape of the microwave rice cooker, it is difficult to use any existing agitating assembly for the microwave rice cooker. In view of that, the microwave agitating plate 4 provided in the present application accordingly, which matches the microwave rice cooker, has an upward folded arc chord part formed on its top surface. The arc chord part comprises an inclined flat reflecting surface 42 and an upper arc chord surface 44, wherein, the inclined flat reflecting surface 42 is inclined downward and inward from a chord B 43 of the upper arc chord surface 44 to a chord A 41 on the top surface; the arc chord part further has a notch, by which the central part of the inclined flat reflecting surface 42 is cut off and a transverse opening 45 is formed in the central part; furthermore, the arc chord part is formed at one side of the center of circle O of the microwave agitating plate 4, a first rectangular hole 47 and a second rectangular hole 48 that penetrate through the microwave agitating plate 4 in the vertical direction are formed at the other side of the center of circle O of the microwave agitating plate 4, an end of the first rectangular hole 47 and an end of the second rectangular hole 48 that are proximal to each other are close to each other and arranged at an included angle from each other, a distal end of the first rectangular hole 47 extends toward one end of the chord A 41, and an distal end of the second rectangular hole 48 extends towards the other end of the chord A 41; wherein, a longer side of the first rectangular hole 47 and a longer side of the second rectangular hole 48 that are near the center of circle O have a reflecting flanged edge 49 that is folded upward, respectively.

Wherein, microwaves can pass through the rectangular holes in the vertical direction, and can pass through the clearance between the circumferential edge of the upward folded arc chord part and the inner wall of the cooking chamber in the vertical direction; the inclined flat reflecting surface 42 of the arc chord part and the reflecting flanged edge 49 of the rectangular hole can reflect microwaves, and the transverse opening 45 formed on the arc chord part by means of the notch enables a part of microwaves that is reflected by the inclined flat reflecting surface 42 and the reflecting flanged edge 49 in multiple times to traverse the arc chord part toward the top surface of the microwave agitating plate 4. Wherein, transverse and vertical transmission of the microwaves and repeated reflection of the microwaves are taken into consideration comprehensively in the structural design of the microwave agitating plate 4. The microwaves are fed via the microwave inlet 9 into the cooking chamber, and are agitated by the microwave agitating plate 4 intensively to improve uniformity of microwave dispersion. It is proved in tests that the microwaves can be agitated intensively especially when the microwave agitating plate 4 that has the above-mentioned structure is rotated intensively, so that the microwaves are distributed more uniformly in the cylindrical cooking chamber, the heating is more uniform, and the heating efficiency can be improved.

The basic structure and functions of the top surface of the microwave agitating plate 4 according to the present application are described above. In this embodiment, the design of the shapes of the basic structures and the dimensional relation among the basic structures is optimized. Specifically, the radial distance between the chord A 41 and the center of circle O shall not be smaller than 0.3 D, wherein, D is the diameter length of the microwave agitating plate 4. The arc chord part is upward folded twice, i.e., the inclined flat reflecting surface 42 is formed by folding upward along the chord A41, and then the upper arc chord surface 44 is formed by folding along the chord B 43; namely, a "Z" shaped flanged edge is formed. Wherein, the upper arc chord surface 44 is preferably parallel to the top surface of the microwave agitating plate 4 to maintain an esthetic appearance. The planar included angle between the inclined flat reflecting surface 42 and the top surface preferably is 145°-150°, i.e., the included angle a in FIG. 4 is 30°-35°. The reflecting flanged edge 49 and the inclined flat reflecting surface 42 are arranged opposite to each other, and preferably are folded upward vertically, and the height of the inclined flat reflecting surface 42 shall not be smaller than the height of the reflecting flanged edge 49, i.e., the folded height H shall be greater than the height H1 of the flanged edge, so that an optimal reflection effect can be attain when the three components are assembled. The reflecting flanged edge 49 preferably extends from a distal end of the longer side near the center of circle O to the center of the longer side.

Figure 16:
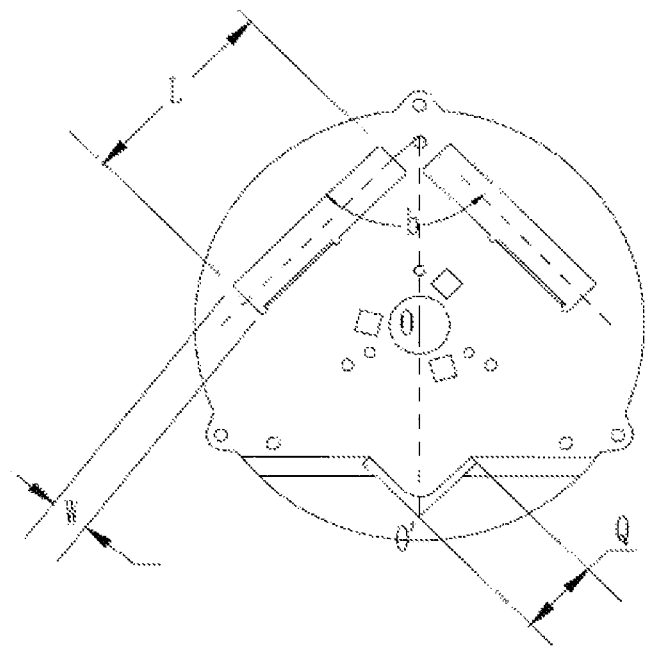
Figure 17:
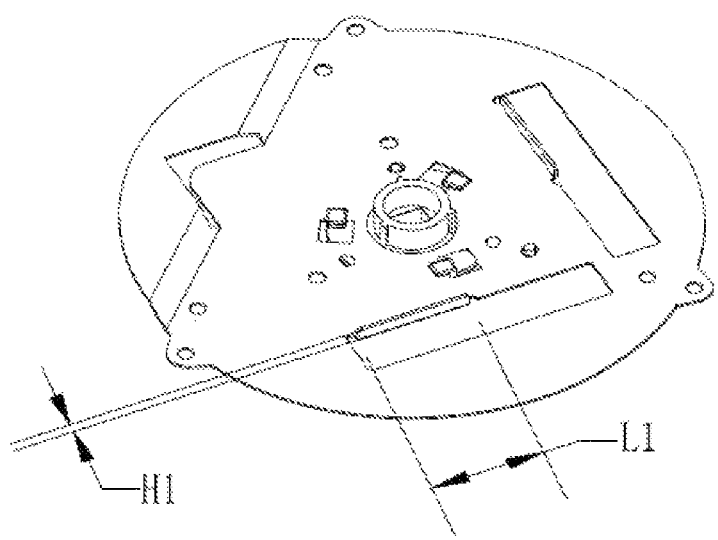

The included angle between the first rectangular hole 47 and the second rectangular hole 48 preferably is a right angle, i.e., the included angle b in FIG. 16 is 90°. More preferably, to realize symmetry of the structures on the top surface of the microwave agitating plate 4 and thereby improve the reflection effect, the first rectangular hole 47 and the second rectangular hole 48 are arranged in a way that the extension lines of the center lines of them in respective length direction intersect each other, wherein, as shown in FIG. 16, the intersection, the center of circle O, and the vertex of triangle O' preferably are in the same line essentially.

In addition, the notch in the arc chord part preferably is a triangular notch, in particular an equilateral triangular notch, the base (non-cut side) of the triangle of the notch is parallel or even aligned to the chord A 41, and a connecting line between the vertex of triangle O' and the center of circle O is essentially perpendicular to the chord A 41 and the chord B 43, as shown in FIG. 16. The two sides of the triangular notch are actual cut sides, which are cut downward from the upper arc chord surface 44 to the top surface of the microwave agitating plate 4, and the cut part of the inclined flat reflecting surface 42 may be removed, so that a transverse opening 45 is formed ultimately.

As an embodiment, in the illustrated microwave agitating plate 4, the diameter D of the disc surface is 103-128 mm, the radial distance between the chord A 41 and the center of circle O (i.e., chord-center distance J) is 38-42 mm; the flanged height H is 4.5 mm, and the height H1 of the flanged edge is 3.5 mm-4.5 mm; the length L of the longer side of the reflecting flanged edge 49 is 55-60 mm, the length W of the shorter side of the reflecting flanged edge 49 is 11.5-12.5 mm, and the length L1 of the flanged edge is 25-30 mm; the length Q of the cut side is 20-25 mm. Within the above-mentioned dimensional ranges, the microwave agitating plate 4 is tested for many times, and an excellent microwave agitation effect is attained in the tests.

On the basis of the above-mentioned cylindrical cooking chamber, microwave transmitting mechanism, and the agitating assembly, the cavity structure of the microwave rice cooker shown in FIG. 6 is formed. Please see FIGS. 8-10. The agitating assembly, the waveguide assembly 6, and the magnetron are mounted in the bottom part of the bottom cap 5. One end of the waveguide assembly 6 abuts against the bottom of the bottom cap 5 and can be fixed by screws or the like, and the magnetron 11 is mounted on the other end of the waveguide assembly 6; the bottom cap 5 has a microwave inlet 9, the microwave outlet 10 of the waveguide assembly 6 is aligned to the microwave inlet 9, the agitating motor 7 may be fixedly mounted via the motor support 64 to the bottom of the bottom cap 5 with screws or the like, the square output shaft 71 of the agitating motor 7 penetrates through the shaft hole, the microwave outlet 10, and the microwave inlet 9 into the bottom cap 5, and is connected to the agitating support 8 to drive the microwave agitating plate 4 to rotate. The design of the opening in the bottom cap 5 not only enables microwave transmission, but also facilitates alignment during assembling.

Please see FIG. 6. The cavity structure of the microwave rice cooker has a compact and reasonable layout. After the circumferential enclosure 17 (see FIG. 4) is added to the cavity structure, an electric rice cooker that has a microwave heating function is formed, and the appearance is more elegant and more compact when compared with large-size square microwave ovens in the prior art. Thus, the microwave rice cooker is easy to move and place in a room, and even can be carried. Therefore, the microwave rice cooker realizes diversification of microwave heating products, and can meet aesthetic and functional requirements of a large quantity of potential customers in the market.

While some preferred embodiments of the present application are described above with reference to the accompanying drawings, the present application is not limited to the details in those embodiments. Various simple variations can be made to the technical scheme of the present application within the scope of the technical concept of the present application. For example, the cooking chamber may be in a shape other than the cylindrical shape described in the embodiments, e.g., a square tube; the assembly structure of the square output shaft 71 and the square inner hole between the agitating motor 7 and the agitating support 8 may be modified to common key-groove fitting. Those simple variations are not beyond the concept of the present application, and should be deemed as falling in the protection scope of the present application.

In addition, it should be noted that the specific technical features described in above embodiments can be combined in any appropriate form, provided that there is no conflict. To avoid unnecessary repetition, the possible combinations are not described specifically in the present application.

Moreover, different embodiments of the present application can be combined freely as required, as long as the combinations don't deviate from the ideal and spirit of the present application. However, such combinations shall also be deemed as falling into the scope disclosed in the present application.

The invention claimed is:

1. A microwave rice cooker, comprising:
 a cavity structure, a door assembly, and an inner pot through which microwaves are configured to be transmitted, wherein the cavity structure comprises a microwave transmitting mechanism, a cavity provided with a cooking chamber therein, and a top cap and a bottom cap located at two ends of the cooking chamber respectively, the bottom cap encloses the cooking chamber at a bottom portion, a top opening of the cooking chamber is formed on the top cap, and the inner pot configured to be put into or taken out of the cooking chamber through the top opening; wherein, the door assembly is mounted on the top cap in an openable and closable manner so as to open or close the cooking chamber from the top, and the microwave transmitting mechanism is mounted at the bottom portion of the bottom cap to feed microwaves into the cooking chamber from the bottom, wherein, the microwave transmitting mechanism comprises a waveguide assembly and a magnetron, the waveguide assembly comprises a transverse part and a downward extension part that extends downward from the end of the transverse part, the magnetron is mounted on the downward extension part, and the magnetron inputs microwaves via a microwave inlet to a microwave transmission cavity in the waveguide assembly, the transverse part is arranged with a microwave outlet, the bottom of the bottom cap is arranged with a microwave feed inlet, the transverse part is connected to the bottom portion of the bottom cap so that the microwave outlet abuts against the microwave feed inlet to feed microwaves into the cooking chamber.

2. The microwave rice cooker according to claim 1, wherein, the bottom cap is in a disc shape, and has a recessed profiled space formed at an inner side of the bottom cap, a circumferential stepped part is arranged in the profiled space, a shelf through which microwaves are configured to be transmitted is arranged on the circumferential stepped part, and the inner pot that is embedded in the cooking chamber is supported on the shelf.

3. The microwave rice cooker according to claim 1, wherein, a first end of the door assembly is hinged via a hinge mechanism to a first end of the top cap, an interlocking mechanism is arranged and a control panel assembly is mounted at a second end of the top cap, a door hook is arranged at a second end of the door assembly, the door assembly is configured to rotate around the hinge mechanism so as to enter into a closed state in which the cooking chamber is closed or an open state in which the cooking chamber is opened;
 wherein, in the closed state, the door assembly covers the top surface of the top cap, the door hook is locked to the interlocking mechanism and the interlocking mechanism transmits a door close signal to the control panel assembly, the control panel assembly receives the door close signal and is triggered to an active state; in the open state, the interlocking mechanism transmits a door open signal, and the control panel assembly is switched to an inactive state according to the door open signal.

4. The microwave rice cooker according to claim 3, wherein, the hinge mechanism comprises a pivot shaft and a torsion spring, the pivot shaft is mounted on the first end of the top cap, the door assembly is configured to pivot around the pivot shaft, the torsion spring is fitted over the pivot shaft, and the two ends of the torsion spring are resiliently biased on the door assembly and the top cap.

5. The microwave rice cooker according to claim 3, wherein, the door assembly comprises a door panel, a door body, and a door seal that are engaged sequentially from outer side to inner side, wherein, the door panel and the door body include a metal plate configured to seal the cooking chamber to prevent transmission of microwaves therein, the door hook extends downward from the door body, and the door seal is lined between the door body and the top cap to seal the cooking chamber when the door assembly is in the closed state.

6. The microwave rice cooker according to claim 1, wherein, the cavity comprises a metal cylindrical plate configured to prevent transmission of microwaves, an inner cylindrical cavity of the cylindrical plate forms the cooking chamber, the top circumference of the cylindrical plate is connected to the top cap, the bottom circumference of the cylindrical plate is hermetically connected to the inner side wall of the bottom cap, and both of the top cap and the bottom cap are metal caps that can present transmission of microwaves.

7. The microwave rice cooker according to claim 6, wherein, the diameter of the inner pot is smaller than the diameter of the cylindrical plate by at least 15 mm.

8. The microwave rice cooker according to claim 1, wherein, the microwave rice cooker further comprises a circumferential enclosure and a base, the cavity structure is mounted on the base, the circumferential enclosure is arranged around the cavity, a top portion of the circumferential enclosure is engaged with the top cap, and the bottom of the circumferential enclosure is engaged with the base.

9. The microwave rice cooker according to claim 8, wherein, the base is further arranged with:
 a frequency converter electrically connected to the magnetron of the microwave transmitting mechanism to regulate a supply voltage of the magnetron; and
 a cooling fan configured to dissipate heat from the frequency converter and the microwave transmitting mechanism.

10. The microwave rice cooker according to claim 1, wherein, the waveguide assembly comprises a base plate and a cover plate, the cover plate is in an "L" shape and comprises a transverse cover plate and a longitudinal cover plate, the base plate is in a "Z" shape and comprises a first transverse base plate, a downward extension plate, and a second transverse base plate arranged sequentially, flanged base plate edges are formed on the periphery of the base plate, and the cover plate hermetically covers the flanged base plate edges of the base plate to form the microwave transmission cavity between the base plate and the cover plate;

wherein, the transverse cover plate is arranged above the first transverse base plate so as to form a transverse chamber of the microwave transmission cavity between the transverse cover plate and the first transverse base plate, the longitudinal cover plate is spaced from the downward extension plate in the transverse direction and the bottom of the longitudinal cover plate extends downward till it is engaged with the second transverse base plate to form a longitudinal chamber of the microwave transmission cavity among the downward extension plate, the second transverse base plate, and the longitudinal cover plate, the microwave outlet is arranged on the transverse cover plate, and the microwave inlet is arranged on the longitudinal cover plate.

11. The microwave rice cooker according to claim 10, wherein, the microwave rice cooker further comprises at least one or all of the following features 1-8:

feature 1: the downward extension plate and the longitudinal cover plate are parallel to each other, and both of them extend downward vertically;

feature 2: the base plate is a single plate that is formed by bending and has flanged edges, the waveguide assembly further comprises angle iron pieces configured to seal the microwave transmission cavity in the lateral direction, and the angle iron pieces are mounted on the lateral flanged base plate edges at the corners where the transverse chamber and the longitudinal chamber of the microwave transmission cavity communicate with each other;

feature 3: the flanged base plate edges are arranged with a welded connecting plate, and the cover plate is welded to the welded connecting plate;

feature 4: the end of the first transverse base plate near the downward extension plate is arranged with a plurality of through-holes with flanged edge, each of the through-holes with flanged edge has a downward circumferential flanged edge, and the downward flanged height of the circumferential flanged edge is not smaller than 2 mm;

feature 5: the inner side wall of the downward extension plate further has a spherical groove formed thereon opposite to the microwave inlet, and the outer wall of the spherical groove protrudes outward to separate antenna heads of the magnetron;

feature 6: the bottom cap is a disc shape, and the outer end part of the waveguide assembly is located within the circumferential edge of the bottom cap in the radial direction of the bottom cap;

feature 7: the length of the longitudinal cover plate in the longitudinal direction is not greater than 1.5 times of the length of the magnetron in the longitudinal direction;

feature 8: the volume ratio of the longitudinal chamber to the transverse chamber of the microwave transmission cavity is not smaller than 2.

12. The microwave rice cooker according to claim 2, wherein, the microwave rice cooker further comprises an agitating assembly, which comprises a microwave agitating plate and an agitating motor, the microwave agitating plate is in a disc shape and arranged between the shelf at the bottom of the cooking chamber and the bottom cap, the agitating motor is mounted below the bottom cap and a motor output shaft of the agitating motor penetrates through the bottom cap and is connected to the microwave agitating plate, and the microwave agitating plate is driven by the agitating motor to rotate to agitate the microwaves that enter into the cooking chamber.

13. The microwave rice cooker according to claim 12, wherein, an arc chord part that is folded upward along a chord A is formed on the top surface of the microwave agitating plate, the arc chord part comprises an inclined flat reflecting surface and an upper arc chord surface, the inclined flat reflecting surface is inclined downward from a chord B of the upper arc chord surface and extend inward to the chord A on the top surface; the arc chord part further has a notch, by which the central part of the inclined flat reflecting surface is cut off and a transverse opening is formed in the central part;

the arc chord part is formed at one side of the center of circle (O) of the microwave agitating plate, a first rectangular hole and a second rectangular hole that penetrate through the microwave agitating plate in the vertical direction are formed at the other side of the center of circle (O) of the microwave agitating plate, an end of the first rectangular hole and an end of the second rectangular hole that are proximal to each other are close to each other and arranged at an included angle from each other, a distal end of the first rectangular hole extends toward one end of the chord A, and an distal end of the second rectangular hole extends towards the other end of the chord A; wherein, a longer side of the first rectangular hole and a longer side of the second rectangular hole that are near the center of circle (O) have a reflecting flanged edge that is folded upward, respectively.

14. The microwave rice cooker according to claim 13, wherein, the microwave rice cooker further comprises at least one or all of the following features A-E:

feature A: the notch is a triangular notch, the triangular base of the notch is parallel to the chord A, a connecting line between the vertex (O') of the triangle and the center of circle (O) is perpendicular to the chord A and the chord B, the two sides of the triangular notch are cut sides, which are cut downward from the upper arc chord surface to the top surface of the microwave agitating plate so as to form the transverse opening;

feature B: the reflecting flanged edge extends from a distal end of the longer side near the center of circle (O) to the center of the longer side;

feature C: the first rectangular hole and the second rectangular hole are arranged at an right angle from each other, the extension lines of the center lines of the first rectangular hole and the second rectangular hole in the respective length direction intersect each other, and the intersection, the center of circle (O), and the vertex of the triangle (O') are in the same line;

feature D: the planar included angle between the inclined flat reflecting surface and the top surface is 145°-150°, and the height of the inclined flat reflecting surface is not greater than the height of the reflecting flanged edge;

feature E: the radial distance between the chord A and the center of circle (O) is not smaller than 0.3D, wherein, D is the diameter length of the microwave agitating plate.

15. The microwave rice cooker according to claim 12, wherein, the agitating assembly further comprises an agitating support, which comprises a cylindrical sleeve and a plurality of claws that are arranged at an interval in the circumferential direction of the periphery of the cylindrical sleeve and extend outward, the microwave agitating plate has a central mounting hole and a plurality of snap slots arranged around the central mounting hole, the cylindrical sleeve of the agitating support is inserted in the central mounting hole, and the plurality of claws are snap-fitted in corresponding snap slots respectively;

wherein, a square inner hole is formed in the bottom of the cylindrical sleeve, the agitating motor comprises a square output shaft, and the square output shaft is embedded in the square inner hole.

\* \* \* \* \*